US006109394A

United States Patent [19]

Messenger

[11] Patent Number: 6,109,394

[45] Date of Patent: Aug. 29, 2000

[54] LUBRICANT IMPREGNATED WEAR PADS FOR EXTENDABLE BOOMS ON MATERIAL HANDLING DEVICES

[75] Inventor: John E. Messenger, Newville, Pa.

[73] Assignee: Ingersoll-Rand Company, Woodcliff Lake, N.J.

[21] Appl. No.: 09/193,533

[22] Filed: Nov. 17, 1998

Related U.S. Application Data

[60] Provisional application No. 60/065,675, Nov. 18, 1997.

[51] Int. Cl.[7] .......... F16N 15/00

[52] U.S. Cl. .......... 184/99; 184/98; 74/490.01; 212/350

[58] Field of Search .......... 184/98, 99; 74/490.01; 248/404, 414; 384/42, 53; 212/350; 414/514, 546; 901/14, 16, 50

[56] References Cited

U.S. PATENT DOCUMENTS

| | | | |
|---|---|---|---|
| 3,782,790 | 1/1974 | Benkowski | 308/3 R |
| 3,959,203 | 5/1976 | Keil | 260/29.1 SB |
| 4,357,785 | 11/1982 | Eklund | 52/632 |
| 4,575,976 | 3/1986 | McDermott et al. | 52/118 |
| 4,759,452 | 7/1988 | Faint et al. | 212/269 |
| 5,212,276 | 5/1993 | Hergenrother et al. | 528/125 |
| 5,829,606 | 11/1998 | Erdmann | 212/350 |
| 5,865,328 | 2/1999 | Kaspar | 212/350 |

*Primary Examiner*—David M. Fenstermacher
*Attorney, Agent, or Firm*—John J. Selko; Mark A. Ussai

[57] ABSTRACT

An extendable boom for a material handling device includes a first boom section for connection to a support frame, the first boom section having a plurality of first structural members. A second boom section is slidable with respect to the first boom section, for supporting a load to be moved and carried. The second boom section has a plurality of second structural members. Wear pads are positioned between the first and second structural members, the wear pads being a cast polyamide material with oil impregnated therein and subjected to dynamic compressive loading condition characterized by a PV value between 26,400 and 32,000. A method to manufacture the extendable boom is also claimed.

6 Claims, 1 Drawing Sheet

LUBRICANT IMPREGNATED WEAR PADS FOR EXTENDABLE BOOMS ON MATERIAL HANDLING DEVICES

This application is a provision of Ser. No. 60/065,675 filed Nov. 18, 1997.

BACKGROUND OF THE INVENTION

This invention relates generally to wear pads used between sliding metal parts and more particularly to wear pads used in extendable booms of material handling equipment. Wear pads, used in booms of material handling equipment, have typically been pieces of a material sandwiched between two plates of steel (in any orientation) which slide back and forth. The material in between the two plates has historically been something of a moderately low coefficient of friction.

As is well known, when two sliding metal boom sections move with respect to each other, while simultaneously carrying a load, a wear pad between the respective boom sections is subject to a dynamic compressive loading condition that is represented by a characteristic known in the art as "PV value". The PV value recognizes the simultaneous imposition on the wear pad of load (compression) and movement of the boom sections. As is well known, the PV value for wear pad material is calculated as:

compression in pounds per square inch times speed of movement in feet per minute, otherwise stated as PSI×FPM. The PV value so calculated is stated for a temperature, such as 73° F. It is believed that subjecting a wear pad material to conditions beyond a maximum PV value or "PV Limit" will cause the wear pad material to break down or lose its ability to act as a lubricating surface, thereby causing damage to the sliding metal parts, possibly even binding up the parts completely.

When a boom designer calculates that the boom sections contemplated will exceed the wear pad's PV Limit, the designer must increase the overlap between boom sections or reduce the speed to get the PV value below the PV Limit specified for the wear pad material. Longer boom sections required for increased overlap are more expensive to build and maintain and generally increase the overall weight of the boom.

One type of wear pad material used for sliding boom weldments is a cast block of polyamide impregnated with oil. Appropriate wear pad material is sold under the product designation as "PA6G+OIL", supplied by Timco, Inc., P.O.Box 2059, Peekskill, N.Y., 10566. Such wear pad material has a PV Limit of 15,000, and the prior art teaches that such material should not be used on booms that exceed this limit.

The foregoing illustrates limitations known to exist in present booms for material handling equipment. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an extendable boom for a material handling device comprising: first boom section means for connection to a support frame, the first boom section means having a plurality of first structural members; second boom section means slidable with respect to the first boom section means, for supporting a load to be moved and carried, the second boom section means having a plurality of second structural members; wear pad means positioned between the first and second structural members; and the wear pad means comprising a cast polyamide material with oil impregnated therein having an effective, or installed PV value between 26,400 and 32,000.

The foregoing and other aspects will become apparent from the following detailed description of the invention when considered in conjunction with the accompanying drawing Figures.

BRIEF DESCRIPTION OF THE DRAWING FIGURES

FIG. 1 is a schematic perspective view of a material handling machine incorporating the boom of the invention, with parts removed.

DETAILED DESCRIPTION

Figure 1:
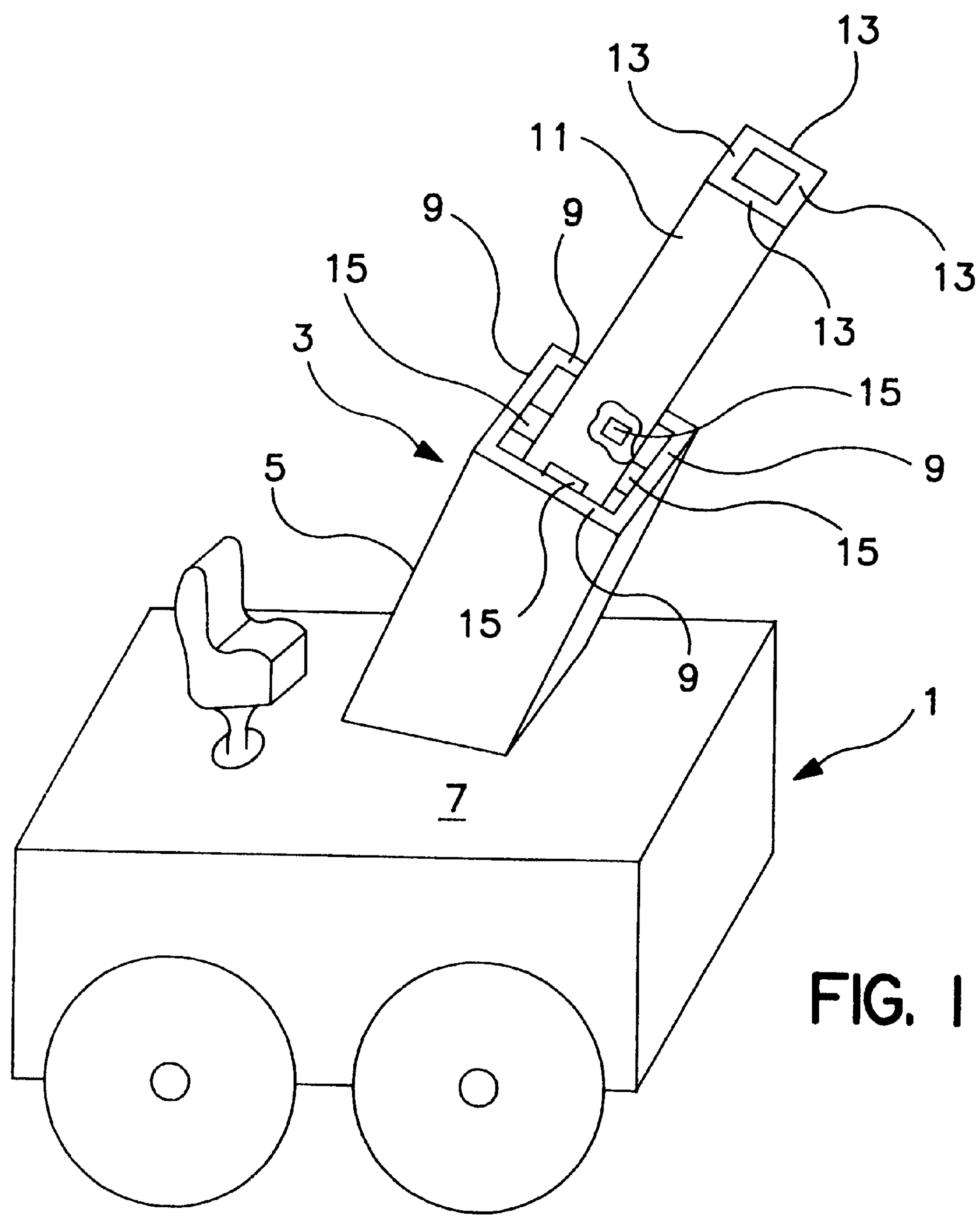

FIG. 1 shows a mobile, variable material handling machine 1 having an extendable boom 3 thereon. Boom 3 comprises a first boom section 5 connected to a support frame 7 of machine 1. First boom section 5 comprises a plurality of first structural members 9 welded together to form a first weldment of conventional design. Boom 3 further comprises a second boom section 11 slidable with respect to first boom section 5, as is well known. Attached to second boom section 11 are conventional attachment devices, such as hooks or buckets (not shown) for supporting a load to be moved and carried. Second boom section 11 comprises a plurality of second structural members 13 welded together to form a second weldment of conventional design.

Positioned between first and second boom sections 5 and 11 are a plurality of wear pads 15. The exact location and number of wear pads 15 is conventional and subject to conventional design considerations. Boom sections 5 and 11 are designed to result in a PV value above 15,000 when using the material of this invention. Preferable, the range of PV values is between 26,400 and 32,000, for a wear pad of a cast polyamide plus oil with the designation "PA6G+OIL", supplied by Timco, Inc., P.O.Box 2059, Peekskill, N.Y., 10566. Wear pads 15 are fastened to one of the structural members by bolts, as is well known.

In operation, this invention resides in the use of a lubricant impregnated material for a wear pad subjected to a PV value in excess of prior art recommended limits, i.e. the PV Limit of 15,000, which requires no lubrication after assembly, only replacement. This wear pad application can only be successful if the metal surfaces which the wear pad slides over is first cleaned with an abrasive cleaning system, leaving a clean and slightly rough or abrasive finish on the metal. Also, a standard hot rolled surface, either quenched and tempered or as received from the mill, will work.

As the wear pad slides back and forth, the clean and slightly abrasive surface strips away a small amount of the wear pad material and embeds the wear pad material in the metal surface.

Once the material completes a break-in cycle, the wear pad material on the moving part is sliding over the wear pad material on the stationary parts and the wear pad material loss from the moving back and forth motion is greatly reduced. This results in a wear pad which requires no lubrication after the initial assembly and which provides an adequately long service life.

The invention is used on steel parts that have a conventional surface resulting from a hot rolling production process. This surface is important because it has sufficient surface roughness, before or after cleaning, to provide crevices and depressions wherein the wear pad material may be deposited to form a wear surface that is a compound combination of metal skin, with a coating thereon of wear pad material. The wear pad material being anchored, or affixed, to the metal surface by mechanical adherence of minute portions extending into surface fissures or variations of the underlaying base steel. The invention would not be applicable in connection with a milled or highly smoothly machined surface. However, a conventional cleaning process can be used such as sand blasting, shot blasting or appropriate chemical cleaning processes (such as pickling in acid), if the cleaning process results in a sufficiently roughened surface to provide the anchoring features to hold the wear pad material.

Typically, first and second boom sections 5 and 11 are painted for weather protection. It is critical for proper performance of the boom of this invention to assure that before connecting together sections 5 and 11, and before painting thereof, the areas of boom structural members that are to contact the wear pads 15 are covered, so as to retain the original hot rolled surface free from any paint coverage. I prefer to cover the areas with tape or with magnetic adhering elements.

Having described the invention, what is claimed is:

1. An extendable boom for a mobile material handling machine having a support frame, the boom comprising:

a first boom section connectable with the machine support frame;

a second boom section slidably engaged with the first boom section, being configured to support a load to be moved and carried by the machine; and a wear pad disposed between the first and second boom sections and formed of a cast polyamide material with oil impregnated therein;

wherein one of the first and second boom sections has a surface section having substantial surface roughness, the wear pad is attached to the other of the first and second boom sections and is contactable with the rough surface section of the one boom section such that sliding movement of the second boom section with respect to the first boom section causes portions of the wear pad to strip away from the wear pad and adhere to the rough surface section to form a wear surface on the one boom section.

2. The extendable boom as recited in claim 1 wherein the wear pad is formed of a material having a specified PV Limit and the first and second boom sections are designed to subject the wear pad to dynamic compressive loading condition characterized by a PV value greater than the PV Limit without failure of the wear pad.

3. The extendable boom as recited in claim 2 wherein the specified PV Limit of the wear pad material is 15,000.

4. The extendable boom as recited in claim 1 wherein the wear pad slides over the wear surface formed on the one boom section when the second boom section slides with respect to the first boom section such that the extendable boom is configured to operate without additional lubrication after assembly of the first and second boom sections and the wear pad.

5. A method of manufacturing an extendable boom for a mobile material handling machine having a support frame, the method comprising the steps of:

(a) providing a first boom section connectable with the machine support frame;

(b) providing a second boom section configured to support a load to be moved and carried by the machine;

(c) providing a wear pad disposed between the first and second boom sections being formed of a cast polyamide material with oil impregnated therein;

(d) providing a surface section having substantial surface roughness on one of the first and second boom sections and attaching the wear pad to the other of the first and second boom sections;

(e) assembling together the first and second boom sections such that the second boom section is slidably engaged with the first boom section and the wear pad is disposed between the first and second boom sections so as to be contactable with the rough surface section of the one boom section; and (f) sliding the second boom section with respect to the first boom section such that the rough surface section of the one boom section strips away portions of the wear pad on the other boom section so that stripped-away portions of the wear pad adhere to the rough surface section to form a wear surface on the one boom section.

6. The method as recited in claim 5 further comprising the steps of:

(a) before assembling together the wear pad and the first and second boom sections, first covering at least one area of sliding contact on one of the first and second boom sections;

(b) thereafter painting the first and second boom sections, whereby the area of sliding contact is unpainted; and (c) thereafter positioning the wear pad at the unpainted area.

* * * * *